US012700064B2

(12) United States Patent
Li et al.

(10) Patent No.: US 12,700,064 B2
(45) Date of Patent: Aug. 4, 2026

(54) MULTI-STAGE MULTI-FRAME DENOISING WITH NEURAL RADIANCE FIELD NETWORKS OR OTHER MACHINE LEARNING MODELS

(71) Applicant: Samsung Electronics Co., Ltd., Suwon-si (KR)

(72) Inventors: Yahang Li, Champaign, IL (US); Nguyen Thang Long Le, Garland, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 18/350,558

(22) Filed: Jul. 11, 2023

(65) Prior Publication Data

US 2025/0022098 A1     Jan. 16, 2025

(51) Int. Cl.
| | |
|---|---|
| *G06T 5/50* | (2006.01) |
| *G06T 5/00* | (2024.01) |
| *G06T 5/70* | (2024.01) |
| *G06T 7/30* | (2017.01) |
| *G06T 7/579* | (2017.01) |

(52) U.S. Cl.
CPC .................. *G06T 5/50* (2013.01); *G06T 5/70* (2024.01); *G06T 7/30* (2017.01); *G06T 7/579* (2017.01); *G06T 2207/10024* (2013.01); *G06T 2207/20081* (2013.01); *G06T 2207/20084* (2013.01)

(58) Field of Classification Search
CPC .. G06T 5/50; G06T 7/579; G06T 7/30; G06T 5/70; G06T 2207/10024; G06T 2207/20081; G06T 2207/20084
See application file for complete search history.

(56) References Cited

U.S. PATENT DOCUMENTS

| | | | |
|---|---|---|---|
| 9,449,374 B2 | 9/2016 | Nash et al. | |
| 9,531,962 B2 | 12/2016 | Sezer et al. | |
| | (Continued) | | |

FOREIGN PATENT DOCUMENTS

| | | | | |
|---|---|---|---|---|
| WO | 2022155933 A1 | 7/2022 | | |
| WO | 2022182421 A1 | 9/2022 | | |
| WO | WO-2022182369 A1 * | 9/2022 | ............. | G06T 15/04 |

OTHER PUBLICATIONS

Le et al., "Apparatus and Method for Interband Denoising and Sharpening of Images," U.S. Appl. No. 17/586,435, filed Jan. 27, 2022, 82 pages.

(Continued)

*Primary Examiner* — Lixi C Simpson

(57) ABSTRACT

A method includes obtaining, using at least one processing device of an electronic device, raw image frames of a scene. The raw image frames include different sets of raw image frames captured at different viewpoints and different viewing angles relative to the scene. The method also includes performing, using the at least one processing device, blending of each set of raw image frames in order to generate blended image frames of the scene. The method further includes training, using the at least one processing device, a machine learning model using the blended image frames. The machine learning model is trained to generate three-dimensional (3D) information about the scene from viewpoints and viewing angles not captured in the sets of raw image frames.

20 Claims, 14 Drawing Sheets

(56) References Cited

U.S. PATENT DOCUMENTS

| | | | |
|---|---|---|---|
| 10,805,649 | B2 | 10/2020 | Pekkucuksen et al. |
| 11,151,731 | B2 | 10/2021 | Zhen et al. |
| 11,610,360 | B2 | 3/2023 | Muller et al. |
| 2022/0198722 | A1* | 6/2022 | Roy .................... H04N 23/743 |
| 2023/0047764 | A1 | 2/2023 | Le et al. |
| 2023/0068727 | A1* | 3/2023 | Saphier ................... G06T 17/20 |
| 2023/0252632 | A1* | 8/2023 | Shalhon Livne ......... G06T 7/33 |
| | | | 382/128 |

OTHER PUBLICATIONS

Glotzbach et al., "Apparatus and Method for Combined Intraband and Interband Multi-Frame Demosaicing," U.S. Appl. No. 17/649,095, filed Jan. 27, 2022, 89 pages.
Mildenhall et al., "NeRF: Representing Scenes as Neural Radiance Fields for View Synthesis," Computer Vision and Pattern Recognition (cs.CV), Aug. 2020, 25 pages.
"Tutorial—COLMAP 3.8—dev documentation," Apr. 2023, 22 pages.
Wikipedia, "Structure from motion," Contributors to Wikimedia projects, Feb. 2023, 15 pages.
Schonberger et al., "Structure-from-Motion Revisited," Vision and Pattern Recognition (CVPR), 2016, 10 pages.
Snavely, "CS5670: Computer Vision," PowerPoint Presentation, Cornell Tech, Spring 2019, 37 pages.
Scratch Pixel, "Ray-Tracing: Generating Camera Rays," Mar. 2023, 22 pages.
Lehtinen et al., "Noise2Noise: Learning Image Restoration without Clean Data," Computer Vision and Pattern Recognition (cs.CV), Oct. 2018, 12 pages.
Lehtinen et al., "NVlabs—Noise2Noise: Learning Image Restoration without Clean Data—Official TensorFlow implementation of the ICML 2018 paper," Nov. 2021, 9 pages.
Cui et al., "Selective Frequency Network for Image Restoration," ICLR 2023, 2023, 13 pages.

* cited by examiner

FIG. 8A     800

FIG. 8B                    802

FIG. 8C                                    804

MULTI-STAGE MULTI-FRAME DENOISING WITH NEURAL RADIANCE FIELD NETWORKS OR OTHER MACHINE LEARNING MODELS

TECHNICAL FIELD

This disclosure relates generally to imaging systems. More specifically, this disclosure relates to multi-stage multi-frame denoising with neural radiance field networks or other machine learning models.

BACKGROUND

Current machine learning-based denoising frameworks often operate on single image frames. For example, multiple image frames may be captured by a camera, and the multiple image frames can be blended to form a single blended image frame. A machine learning-based denoising model can then be applied to the single blended image frame in order to remove noise from the blended image frame.

SUMMARY

This disclosure relates to multi-stage multi-frame denoising with neural radiance field networks or other machine learning models.

In a first embodiment, a method includes obtaining, using at least one processing device of an electronic device, raw image frames of a scene. The raw image frames include different sets of raw image frames captured at different viewpoints and different viewing angles relative to the scene. The method also includes performing, using the at least one processing device, blending of each set of raw image frames in order to generate blended image frames of the scene. The method further includes training, using the at least one processing device, a machine learning model using the blended image frames. The machine learning model is trained to generate three-dimensional (3D) information about the scene from viewpoints and viewing angles not captured in the sets of raw image frames. In another embodiment, a non-transitory machine readable medium includes instructions that when executed cause at least one processor to perform the method of the first embodiment.

In a second embodiment, an electronic device includes at least one processing device configured to obtain raw image frames of a scene. The raw image frames include different sets of raw image frames captured at different viewpoints and different viewing angles relative to the scene. The at least one processing device is also configured to perform blending of each set of raw image frames in order to generate blended image frames of the scene. The at least one processing device is further configured to train a machine learning model using the blended image frames. The machine learning model is trained to generate 3D information about the scene from viewpoints and viewing angles not captured in the sets of raw image frames.

In a third embodiment, a method includes obtaining a noisy image frame associated with a scene and identifying a pose associated with the noisy image frame. The method also includes generating rays based on the pose and providing the rays to a machine learning model. The method further includes generating 3D information about the scene using the machine learning model and generating a denoised image of the scene using the 3D information about the scene. The machine learning model is trained using multi-stage multi-frame denoising in which (i) one stage is based on similarities of raw image frames within each of multiple sets of raw image frames and (ii) another stage is based on different perspectives associated with different ones of the sets of raw image frames In another embodiment, an apparatus includes at least one processing device configured to perform the method of the third embodiment. In still another embodiment, a non-transitory machine readable medium includes instructions that when executed cause at least one processor to perform the method of the third embodiment.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive." and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include." or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B." "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 8A through 8C illustrate example results obtained using a trained NeRF network or other machine learning model according to this disclosure;

DETAILED DESCRIPTION

Figure 1:
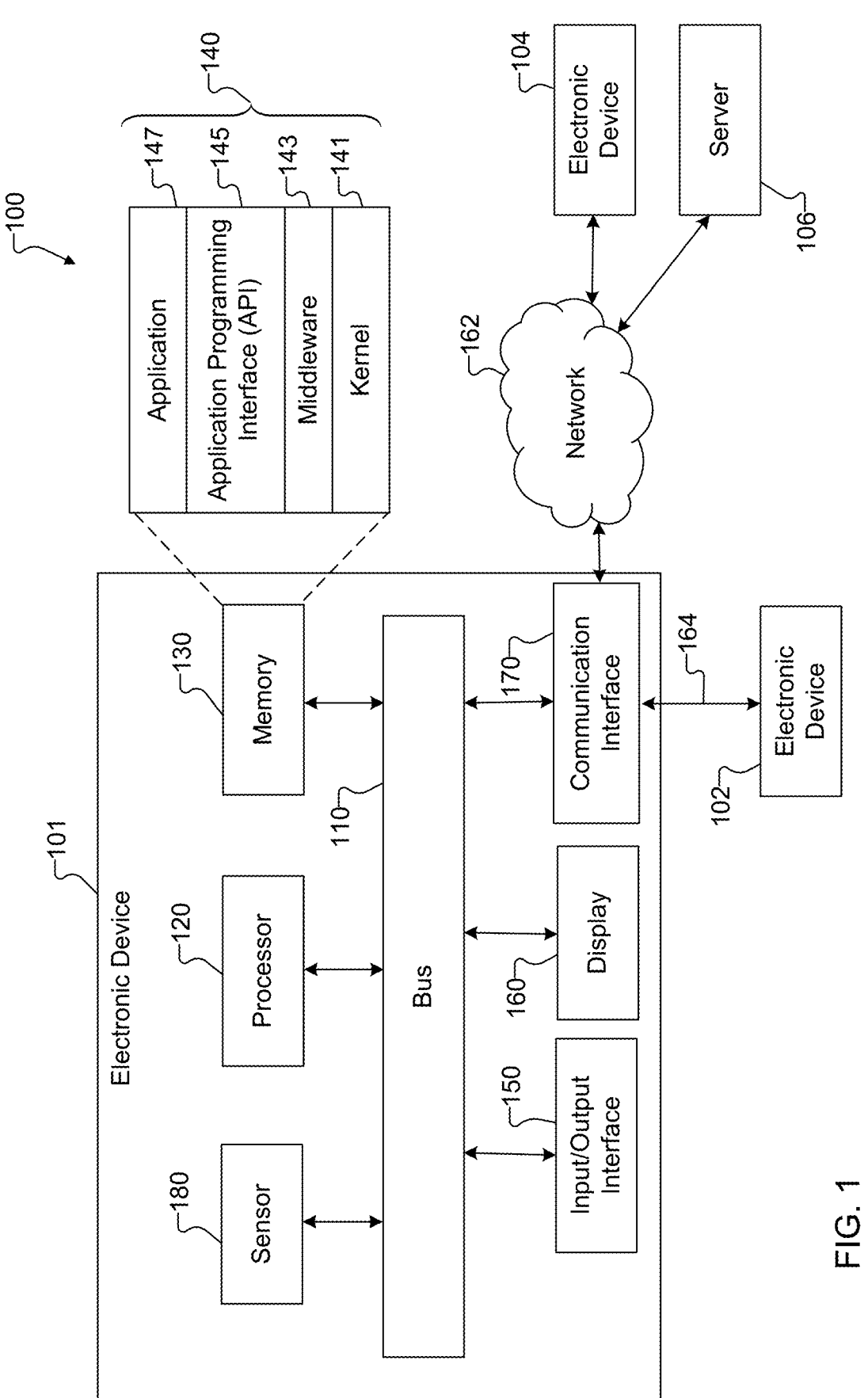
FIG. 1 illustrates an example network configuration including an electronic device according to this disclosure.

FIGS. 1 through 10, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, current machine learning-based denoising frameworks often operate on single image frames. For example, multiple image frames may be captured by a camera, and the multiple image frames can be blended to form a single blended image frame. A machine learning-based denoising model can then be applied to the single blended image frame in order to remove noise from the blended image frame. While this approach can be effective, it may not be as effective as possible due to the limited design and use of the machine learning-based denoising model. Among other things, these machine learning-based denoising models are not tailored for specific scenes. Also, operating on a single image frame can prevent the machine learning-based denoising models from taking full advantage of a multi-image frame capture pipeline.

Separately, neural radiance field (NeRF) networks have been developed to support fusion of multiple image frames of scenes. A NeRF network is an example of a multi-layer perceptron (MLP) network, which is a fully-connected multi-layer neural network. A NeRF network can be used to generate novel views of a complex three-dimensional (3D) scene based on a partial set of two-dimensional (2D) images. In other words, the NeRF network can be trained using 2D images of a 3D scene so that additional images of the 3D scene can be generated from specific viewpoints and specific viewing directions, including viewpoints and viewing directions not captured in the 2D images. For example, a NeRF network can be trained to generate color and density information within a scene, and classical volume rendering equations can be used to convert the color and density information into an image of the scene from a specific viewpoint and a specific viewing direction.

Training data that is used to train a NeRF network is typically limited to RGB image frames. Unfortunately, RGB image frames are generated by an image processing pipeline and contain inherent information losses. In contrast, multi-frame processing techniques can often operate on raw image sensor data (such as Bayer image sensor data) prior to image signal processing, which allows for high-quality denoising with minimal texture losses. However, multi-frame processing techniques generally assume that there is a strong similarity (smaller baseline) between image frames for alignment purposes and can fail to properly register image frames with larger baselines. A NeRF network typically requires the use of image frames with large baselines for training, which allows the NeRF network to learn how to recreate a 3D scene from viewpoints and viewing directions not captured in 2D images. Note here that "baseline" refers to the distance between the focal points of two image frames, which can be due to the physical distance between two cameras capturing the image frames or due to displacement of a single camera between captures of the image frames. In the latter case, smaller displacements can result in smaller baselines between image frames, while larger displacements can result in larger baselines between image frames.

This disclosure provides various techniques related to multi-stage multi-frame denoising with NeRF networks or other machine learning models. As described in more detail below, the disclosed techniques allow training of a machine learning model (such as a NeRF network) using multiple sets of training image frames of a scene, where (i) similarities between the training image frames within each set are exploited and (ii) different perspectives of the training image frames within different sets are exploited. For example, raw image frames of a scene can be obtained, where the raw image frames include different sets of raw image frames captured at different viewpoints and different viewing angles relative to the scene. Blending of each set of raw image frames can be performed in order to generate blended image frames of the scene. A machine learning model can be trained using the blended image frames, where the machine learning model is trained to generate 3D information about the scene from viewpoints and viewing angles not captured in the sets of raw image frames.

A NeRF network or other machine learning model trained in this manner may be used or deployed to one or more consumer electronic devices or other devices for use. For example, a noisy image frame associated with a scene can be obtained, and a pose associated with the noisy image frame can be identified. Rays based on the pose can be generated and provided to a machine learning model, and 3D information about the scene can be generated using the machine learning model. A denoised image of the scene can be generated using the 3D information about the scene.

In this way, these techniques allow similarities of raw image frames from common viewpoints and viewing angles to be exploited (such as by using multi-frame processing) in order to perform functions like image frame alignment and blending, and these techniques allow different perspectives of the raw image frames from different viewpoints and viewing angles to be exploited (such as by using a NeRF network). Moreover, in some cases, it is possible to train the NeRF network or other machine learning model using raw blended image frames, which do not have the inherent information losses associated with RGB image frames. As a result, the NeRF network or other machine learning model can achieve improved results. In addition, in some cases, these techniques allow the overall architecture to be trained and used to perform denoising and demosaicing jointly, which can facilitate faster and more effective image generation.

Note that while some of the embodiments discussed below are described in the context of use in consumer electronic devices (such as smartphones), this is merely one example. It will be understood that the principles of this disclosure may be implemented in any number of other suitable contexts and may use any suitable device or devices. Also note that while some of the embodiments discussed below are described based on the assumption that one device (such as a server) performs training of a NeRF network or other machine learning model that is deployed to one or more other devices (such as one or more consumer electronic devices), this is also merely one example. It will be understood that the principles of this disclosure may be implemented using any number of devices, including a single device that both trains and uses a machine learning model. In general, this disclosure is not limited to use with any specific type(s) of device(s).

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O)) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU) The processor 120 is able to perform control on at least one of the other components of the electronic device 101 and/or perform an operation or data processing relating to communication or other functions. As described in more detail below, the processor 120 may perform various operations related to training a NeRF network or other machine learning model within a multi-stage multi-frame denoising process and/or use of a trained NeRF network or other machine learning model.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to training and/or use of a NeRF network or other machine learning model. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform various operations related to training a NeRF network or other machine learning model within a multi-stage multi-frame denoising process and/or use of a trained NeRF network or other machine learning model.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
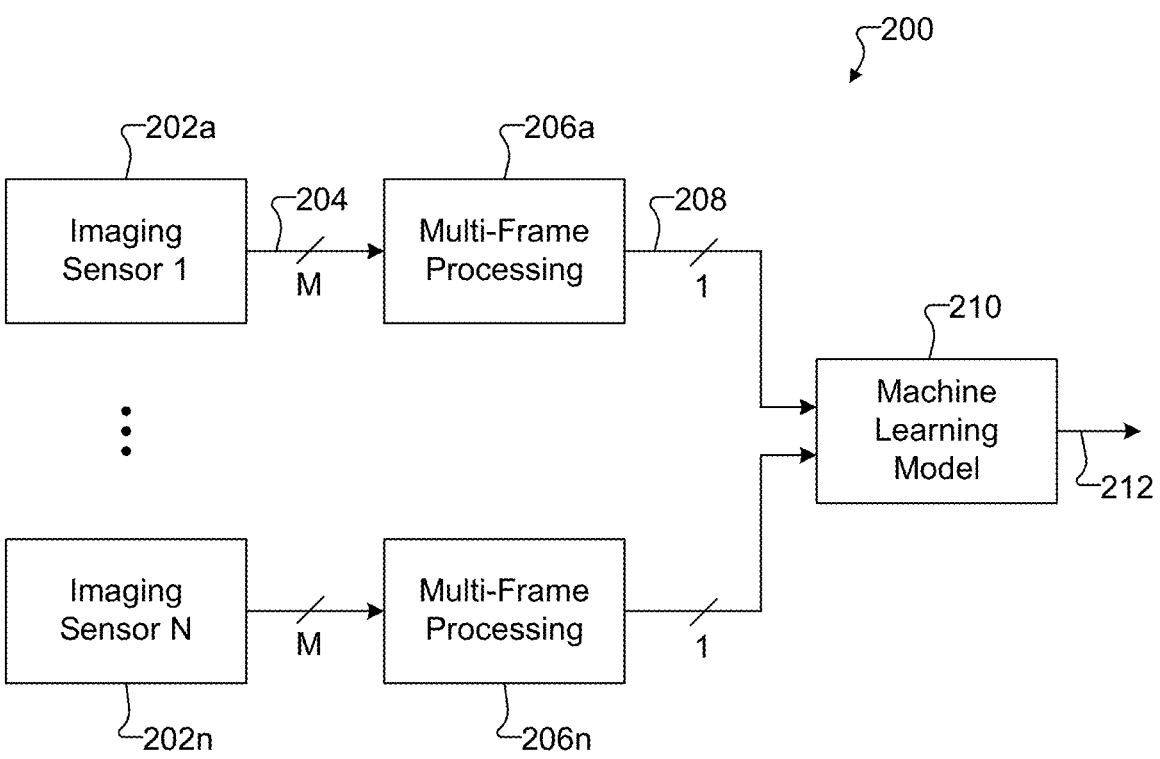
FIG. 2 illustrates an example architecture supporting multi-stage multi-frame denoising with a neural radiance field (NeRF) network or other machine learning model according to this disclosure.

FIG. 2 illustrates an example architecture 200 supporting multi-stage multi-frame denoising with a NeRF network or other machine learning model according to this disclosure. For ease of explanation, the architecture 200 shown in FIG. 2 is described as being used by the server 106 in the network configuration 100 shown in FIG. 1 to train a NeRF network or other machine learning model. However, the architecture 200 could be used by any other suitable device(s) (such as the electronic device 101) and in any other suitable system(s), and the architecture 200 may be used to train any other suitable machine learning model(s).

As shown in FIG. 2, the architecture 200 includes or is used in conjunction with one or more cameras or other imaging sensors 202a-202n, which are used to capture training image frames 204 of a scene. Any suitable number of cameras or other imaging sensors 202a-202n may be used here. In some cases, for example, an imaging sensor array may include multiple cameras or other imaging sensors 202a-202n that are used to capture training image frames 204 of a scene at or near the same time from different locations. In other cases, one or more cameras or other imaging sensors 202a-202n may be used to capture training image frames 204 of a scene at different times from different locations, such as when the one or more imaging sensors 202a-202n are located on at least one portable device. In general, the architecture 200 may include or may be used in conjunction with one or more cameras or other imaging sensors 202a-202n configured to capture training image frames 204 of a scene. Each training image frame 204 can have any suitable resolution and format, such as Bayer or other raw image frames. In this example, the one or more imaging sensors 202a-202n are shown as being used to capture multiple sets of training image frames 204, where each set includes M training image frame 204 and where M is an integer greater than one.

If each of multiple imaging sensors is used to capture one training image frame of a scene, the training image frames provide different perspectives when captured at significantly different locations, but the training image frames would lack similarity with one another. If a single imaging sensor is used to capture multiple training image frames of a scene at the same location, the training image frames have similarity, but the training image frames lack different perspectives. The approaches described below can use multiple sets of training image frames 204, where (i) each set includes training image frames 204 having similarity with one another and (ii) different sets include training image frames 204 having different perspectives. This allows the approaches described below to exploit similarities within each set of training image frames 204 and to exploit different perspectives of different sets of training image frames 204. In some cases, one or more imaging sensors 202a-202n at up to one hundred or more locations may be used to capture up to fourteen or more training image frames 204 at each location (although these numbers are examples only).

The architecture 200 shown in FIG. 2 trains a machine learning model using multi-stage multi-frame denoising based on the captured sets of training image frames 204. In this example, the first stage involves the performance of a multi-frame processing (MFP) operation 206a-206n for each set of training image frames 204. Each multi-frame processing operation 206a-206n can be used to combine the training image frames 204 in the associated set and generate a single blended training image frame 208. For example, each multi-frame processing operation 206a-206n can be used to perform alignment, deghosting, and blending functions. Alignment can generally involve adjusting at least some of the training image frames 204 in the associated set so that common features within the scene are located at common positions within the aligned training image frames 204. Deghosting can generally involve selecting portions of the aligned training image frames 204 that will or will not be blended together based on whether motion is detected within the portions of the aligned training image frames 204. For instance, blending of common areas within the aligned training image frames 204 may occur when little or no motion is detected in those areas, while areas within a selected reference training image frame 204 may be used without blending when motion is detected in those areas. Blending can generally involve combining image data in some or all portions of the aligned training image frames 204 based on the deghosting determinations. In some cases, each multi-frame processing operation 206a-206n may implement one or more of the processes described in U.S. Pat. No. 10,805,649 (which is hereby incorporated by reference in its entirety). This patent describes processes for blending image frames, and those processes can involve the alignment of image frames, compensation for ghosting, and blending Note, however, that each multi-frame processing operation 206a-206n may operate in any other suitable manner.

The blended training image frames 208 are used to train a machine learning model 210, such as a NeRF network. For example, the NeRF network or other machine learning model 210 may be trained to generate outputs 212 that include 3D information (like color and density information) associated with the scene captured in the training image frames 204, where the 3D information can be used to render output images. Here, the blended training image frames 208 can represent image frames of a common scene from different perspectives, and the machine learning model 210 can be trained to generate outputs 212 for a queried viewpoint and viewing direction. Here, the queried viewpoint can represent a point in 3D space relative to the scene, and the viewing direction can represent the direction of view from that point in 3D space. The NeRF network or other machine learning model 210 can be trained using the blended training image frames 208, ideally until a loss value associated with the machine learning model 210 falls below a threshold value. The loss value identifies differences or errors between the actual outputs 212 from the machine learning model 210 and desired outputs or errors between an image generated based on the actual outputs 212 from the machine learning model 210 and a desired image. When the loss value falls below the threshold value, that is indicative that the NeRF network or other machine learning model 210 has been trained to properly generate 3D information (such as color and density data), at least to within a desired degree of accuracy as defined by the threshold value.

As can be seen here, the architecture 200 supports use of a multi-stage process that processes multi-frame inputs. That is, the multi-frame processing operations 206a-206n are used in a first stage to process sets of raw training image frames 204, which allows the multi-frame processing operations 206a-206n to exploit the similarities of the raw training image frames 204 within each set. This is because the raw training image frames 204 within each set can have smaller baselines, which (among other things) permits alignment, deghosting, and blending of those raw training image frames 204. The machine learning model 210 is used in a second stage to process the resulting blended training image frames 208, which allows the machine learning model 210 to exploit different perspectives of the scene contained within the blended training image frames 208. This is because the blended training image frames 208 can have larger baselines, which (among other things) permits learning of the 3D structure of the scene by the machine learning model 210.

As described below, the blended training image frames 208 used to train the machine learning model 210 may represent raw blended training image frames or RGB blended training image frames. The use of raw blended training image frames can help to reduce or eliminate the inherent information losses that exist with the use of RGB blended training image frames. However, the use of raw blended training image frames may necessitate additional operations as part of the training and/or inferencing process (es) for the machine learning model 210.

Although FIG. 2 illustrates one example of an architecture 200 supporting multi-stage multi-frame denoising with a NeRF network or other machine learning model, various changes may be made to FIG. 2. For example, various components or functions shown in FIG. 2 may be combined, further subdivided, rearranged, replicated, or omitted and additional components can be added according to particular needs. As a particular example, n multi-frame processing operations 206a-206n are shown here (one for each set of training image frames 204), which allows the various sets of training image frames 204 to undergo multi-frame processing in parallel. However, it is also possible to use fewer multi-frame processing operations or one multi-frame processing operation to process sets of training image frames 204 sequentially.

Figure 3:
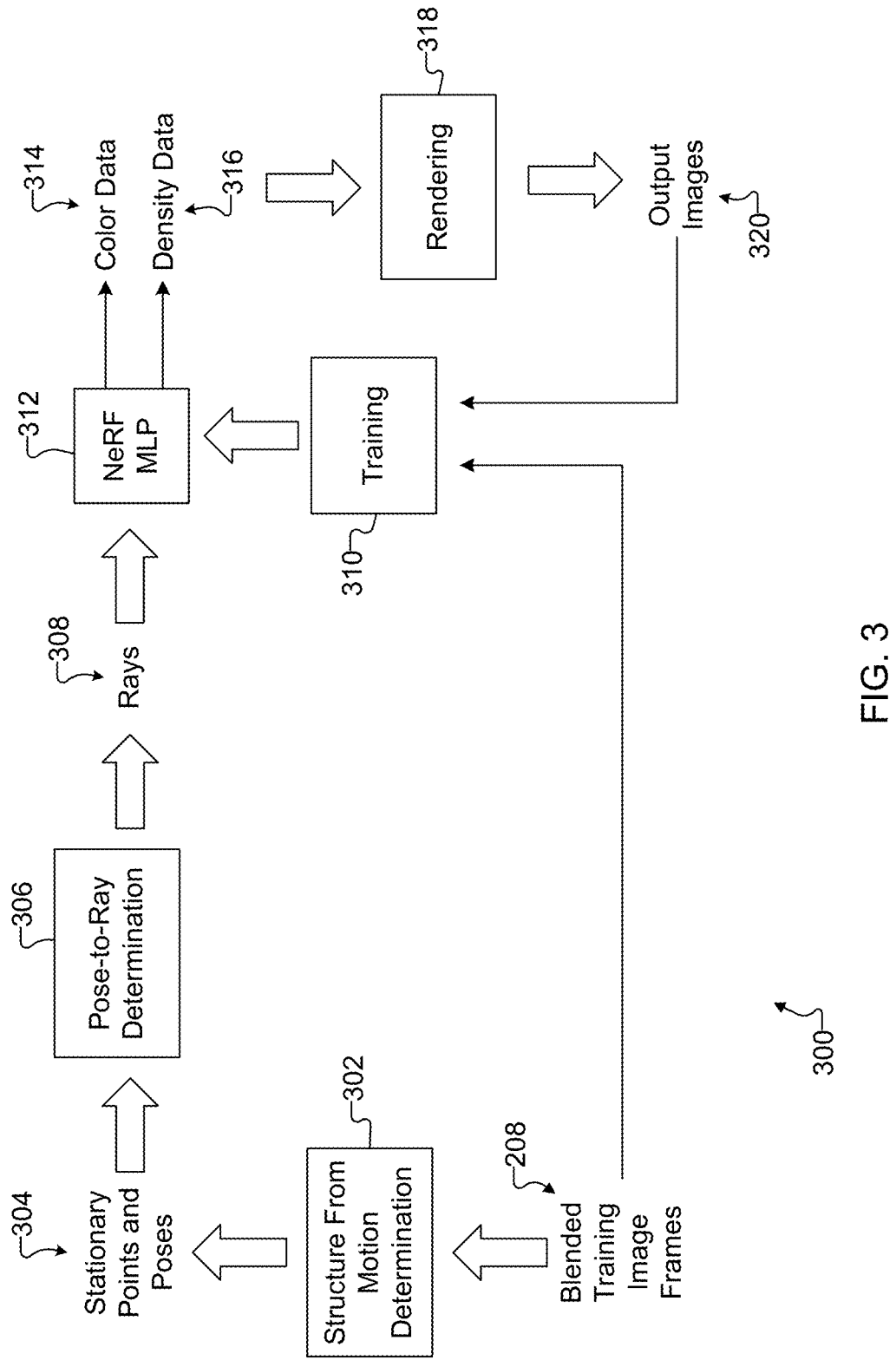
FIG. 3 illustrates an example training process for a NeRF network or other machine learning model according to this disclosure.

FIG. 3 illustrates an example training process 300 for a NeRF network or other machine learning model according to this disclosure. For ease of explanation, the training process 300 shown in FIG. 3 is described as being performed by the server 106 in the network configuration 100 shown in FIG. 1 to train a NeRF network or other machine learning model 210 based on the architecture 200 shown in FIG. 2. However, the training process 300 could be used by any other suitable device(s) (such as the electronic device 101) and in any other suitable system(s), and the training process 300 may be used to train any other suitable machine learning model(s).

As shown in FIG. 3, the blended training image frames 208 are provided to a structure from motion determination operation 302, which generally operates to estimate sparse 2D feature points within a scene using the blended training image frames 208 associated with the scene. The phrase "structure from motion" here refers to the fact that the sparse 2D feature points within the scene can be estimated using blended training image frames 208 that are associated with different locations (thereby providing different perspectives of the scene). As a result, motion parallax can be used to derive depth information of the scene Motion parallax refers to the fact that objects move differently (such as by different amounts) when viewed from different locations depending on their depths from those locations. The structure from motion determination operation 302 processes the blended training image frames 208 associated with the scene in order to generate outputs 304, which can include sparse 3D feature points that represent stationary points within the scene and imaging sensor poses that identify the poses of the imaging sensor(s) used to capture the training image frames 204. Note that this can be performed using any suitable number of blended training image frames 208 associated with the scene.

The outputs 304 are provided to a pose-to-ray determination operation 306, which generally operates to convert the imaging sensor poses identified by the structure from motion determination operation 302 into corresponding rays 308 within the scene. Among other things, these rays 308 may pass from each imaging sensor pose through the sparse 3D feature points. The pose-to-ray determination operation 306 may use any suitable technique to convert imaging sensor poses into rays 308, such as by using a ray tracing algorithm or other 3D rendering algorithm.

In FIG. 3, a training operation 310 is being used to train a machine learning model, which in this example represents a NeRF MLP network 312 that implements the machine learning model 210. The NeRF MLP network 312 generally operates to process the rays 308 in order to generate 3D information associated with the scene. In this example, the 3D information includes color data 314 and density data 316. The color data 314 and the density data 316 can collectively define the color and density of each point within a 3D space. The color data 314 and the density data 316 may be used in any suitable manner. In this example, the color data 314 and the density data 316 are provided to a rendering operation 318, which can use classical volume rendering equations or other techniques to render various output images 320, such as one output image 320 for each imaging sensor pose. For instance, based on a specified viewpoint and a specified viewing angle (which can collectively define an image plane) associated with a specific imaging sensor pose, the rendering operation 318 can render an output image 320 of the scene from that viewpoint and at that viewing angle using the color data 314 and the density data 316. Ideally, the output images 320 can represent denoised images compared to the training image frames 204.

In some embodiments, the operation of the NeRF MLP network 312 during the training process 300 may be expressed as follows.

$$(C, \sigma) = MLP_\theta(r) \tag{1}$$

Here, $MLP_\theta(\cdot)$ represents the function implemented by the NeRF MLP network 312, r represents a specific ray 308, and $\theta$ represents the trained network parameters. Also, C and $\sigma$ respectively represent the color data 314 and the density data 316 determined for that specific ray 308 using the NeRF MLP network 312. The rendering operation 318 can use the color data 314 and the density data 316 to generate an output image 320 associated with the specified viewpoint and viewing angle.

During training, the NeRF MLP network 312 generates the color data 314 and the density data 316 based on the rays 308. The training operation 310 can compare the generated color data 314 and the generated density data 316 with ground truth outputs (or the output images 320 rendered based on the generated color data 314 and the generated density data 316 with ground truth images) in order to identify a loss value representing the errors between the actual and desired outputs or images. If the loss value is above a threshold value, the training operation 310 can adjust weights or other hyperparameters of the NeRF MLP network 312, and another training iteration can occur. Ideally, the loss value decreases over time and eventually falls below the threshold value, at which point training of the NeRF MLP network 312 may be complete.

The training operation 310 can use any suitable technique(s) to train the NeRF MLP network 312 or other machine learning model 210. In some embodiments, for example, the training operation 310 can use a "Noise2Noise" based training technique. The "Noise2Noise" based process is described in Lehtinen et al., "Noise2Noise: Learning Image Restoration without Clean Data" (see https://arxiv.org/pdf/1803.04189.pdf), and code for implementing this process is available (see https://github.com/NVlabs/noise2noise) (both of which are hereby incorporated by reference in their entirety). In the Noise2Noise technique, noisy image frames (such as one or more of the training image frames 204 or blended training image frames 208) can be processed in order to remove noise from the noisy image frames and generate cleaner images. These cleaner images can be used as ground truth images and compared to the actual output images 320 generated by the rendering operation 318 based on the color data 314 and the density data 316 produced by the NeRF MLP network 312 or other machine learning model 210. The output images 320 are intended to represent denoised images, so a comparison between the ground truth images and the output images 320 provides a measure of how well the NeRF MLP network 312 or other machine learning model 210 is or is not performing denoising. Note, however, that any other suitable training technique(s) may be used by the training operation 310 to train the NeRF MLP network 312 or other machine learning model 210. For instance, in other embodiments, the training operation 310 may have access to ground truth images, or the training operation 310 may use another technique to generate ground truth images from noisy images.

Although FIG. 3 illustrates one example of a training process 300 for a NeRF network or other machine learning model, various changes may be made to FIG. 3. For example, various components or functions shown in FIG. 3 may be combined, further subdivided, rearranged, replicated, or omitted and additional components can be added according to particular needs.

Figure 4:
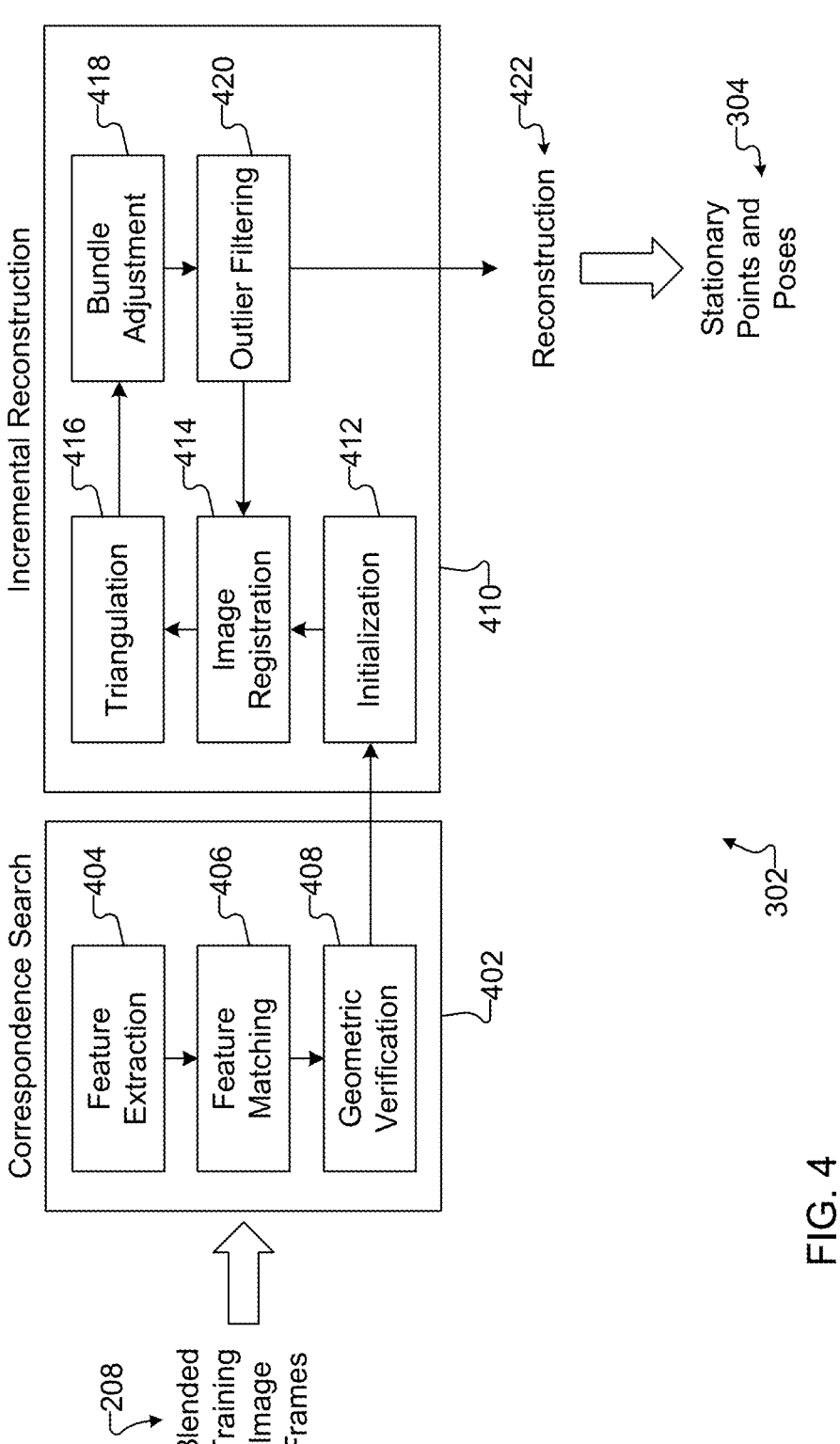
FIG. 4 illustrates an example structure from motion determination operation in the process of FIG. 3 according to this disclosure.

FIG. 4 illustrates an example structure from motion determination operation 302 in the process 300 of FIG. 3 according to this disclosure. As shown in FIG. 4, the blended training image frames 208 are processed using a correspondence search function 402, which generally operates to identify overlap between the blended training image frames 208 and to identify projections of common points within the overlapping portions of the blended training image frames 208. In this example, the correspondence search function 402 includes a feature extraction function 404, a feature matching function 406, and a geometric verification function 408.

The feature extraction function 404 operates to identify features within the blended training image frames 208, such as features associated with people, vehicles, buildings, natural landmarks, or other contents of the blended training image frames 208. The feature matching function 406 operates to match the identified features in different blended training image frames 208 so that common features captured in multiple blended training image frames 208 are identified as being the same features. For example, the feature matching function 406 may determine that one or more identified features associated with the same object in different blended training image frames 208 represent the same features. The geometric verification function 408 attempts to verify whether the matching features are correct, such as by determining whether a valid mapping or transformation from one blended training image frame 208 to another blended training image frame 208 can be identified. The outputs of the correspondence search function 402 may take the form of a scene graph in which the blended training image frames 208 are nodes of the scene graph and verified pairs of blended training image frames 208 are edges of the scene graph.

The scene graph or other outputs of the correspondence search function 402 are provided to an incremental reconstruction function 410, which generally operates to identify imaging sensor poses for the verified blended training image frames 208 and scene structure based on the verified blended training image frames 208. In this example, the incremental reconstruction function 410 includes an initialization function 412, an image registration function 414, a triangulation function 416, a bundle adjustment function 418, and an outlier filtering function 420.

The initialization function 412 operates to create an initial model of the scene based on two or more of the blended training image frames 208. The image registration function 414 operates to register additional blended training image frames 208 (which were not used to create the initial model) with the initial model of the scene. Each additional blended training image frame 208 can include at least some of the scene points that are already within the model of the scene, and the triangulation function 416 uses the registered blended training image frames 208 to identify additional scene points within the model of the scene. Since the image registration function 414 and the triangulation function 416 are separate processes, uncertainties may exist with the imaging sensor poses and the scene points, and the bundle adjustment function 418 can apply nonlinear refinement to the imaging sensor poses and the scene points in order to refine the model of the scene. The outlier filtering function 420 reduces weights on or removes outliers in the model of the scene.

The final model of the scene generated by the incremental reconstruction function 410 can represent a reconstruction 422 of that scene, where the reconstruction 422 of the scene represents a 3D representation of the scene. Thus, the reconstruction 422 is a 3D representation of the scene and is generated based on 2D image frames of the scene. The reconstruction 422 may include or be used to generate the outputs 304, such as the imaging sensor poses and stationary points within the scene.

The model of the scene generated here can have any suitable form. In some embodiments, imaging sensor poses that are defined by the model of the scene may include an N×3×5 matrix, where N represents the number of blended training image frames 208. Each blended training image frame 208 can be associated with two depth values that identify the closest and farthest scene content from a specific point of view associated with the corresponding pose. Also, each 3×5 matrix may include a 3×4 camera-to-world affine transform that is concatenated with a 3×1 column. The 3×1 column may include an image height, an image width, and a focal length associated with the corresponding blended training image frame 208.

Although FIG. 4 illustrates one example of a structure from motion determination operation 302 in the process 300 of FIG. 3, various changes may be made to FIG. 4. For example, various components or functions shown in FIG. 4 may be combined, further subdivided, rearranged, replicated, or omitted and additional components can be added according to particular needs.

Figure 5:
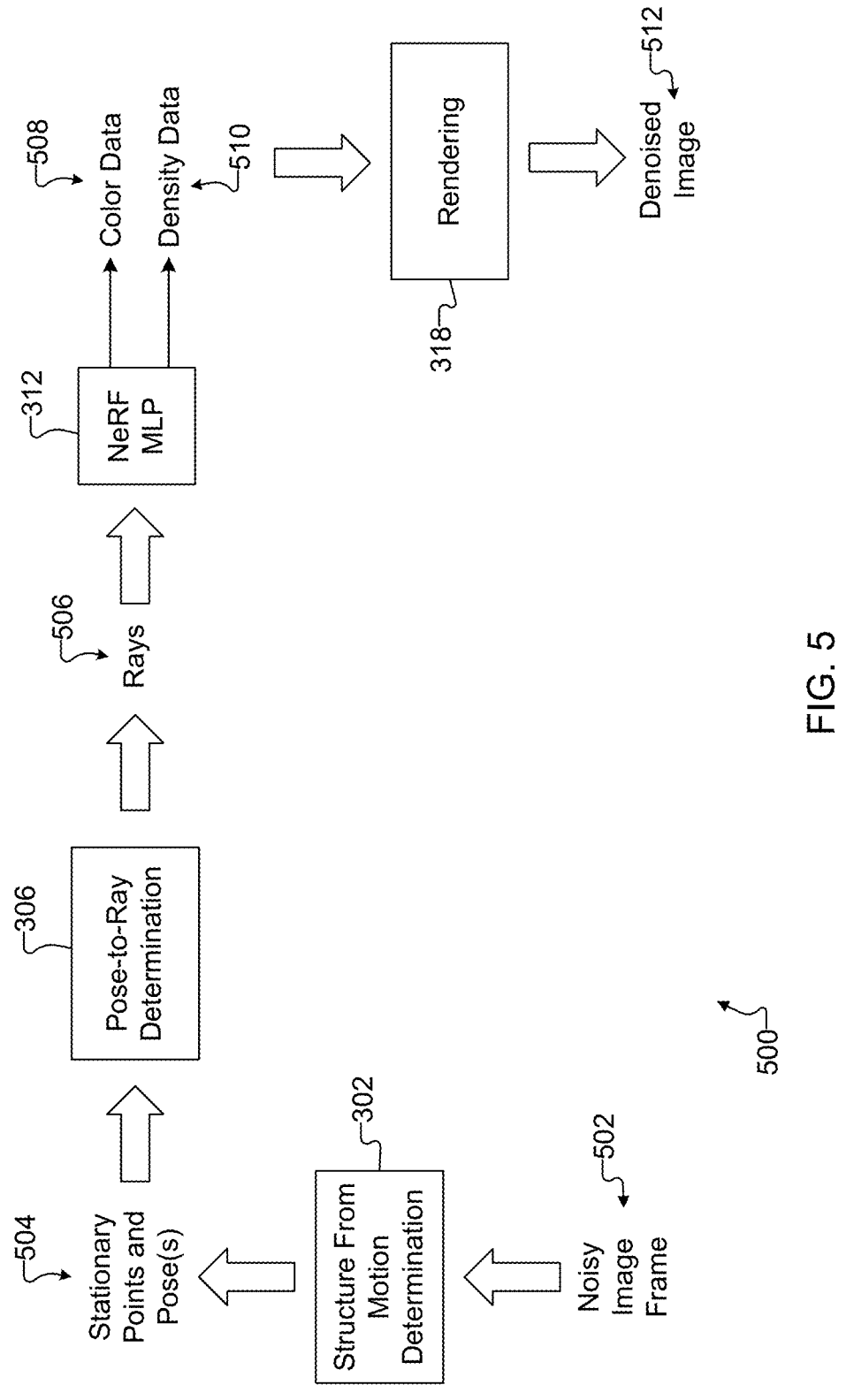
FIG. 5 illustrates an example inferencing process using a NeRF network or other machine learning model according to this disclosure.

FIG. 5 illustrates an example inferencing process 500 using a NeRF network or other machine learning model according to this disclosure. For ease of explanation, the inferencing process 500 shown in FIG. 5 is described as being performed by the electronic device 101 in the network configuration 100 shown in FIG. 1 to use a trained NeRF network or other machine learning model 210. However, the inferencing process 500 could be used by any other suitable device(s) (such as the server 106) and in any other suitable system(s), and the inferencing process 500 may be used with any other suitable machine learning model(s).

As shown in FIG. 5, at least one noisy image frame 502 is obtained, such as from an imaging sensor 180 of the electronic device 101. The at least one noisy image frame 502 is provided to the structure from motion determination operation 302, which estimates sparse 2D feature points within a scene using the noisy image frame(s) 502 and generates outputs 504. The outputs 504 can include sparse 3D feature points that represent stationary points within the scene and one or more imaging sensor poses that identify the pose(s) of the imaging sensor(s) used to capture the noisy image frame(s) 502. The outputs 504 are provided to the pose-to-ray determination operation 306, which converts the imaging sensor pose(s) identified by the structure from motion determination operation 302 into corresponding rays 506 within the scene.

The rays 506 are provided as inputs to a trained machine learning model, which in this example represents a trained version of the NeRF MLP network 312 (which may be trained using the process 300 as described above). The NeRF MLP network 312 processes the rays 506 in order to generate 3D information associated with the scene. In this example, the 3D information includes color data 508 and density data 510. The color data 508 and the density data 510 may be used in any suitable manner. In this example, the color data 508 and the density data 510 are provided to the rendering operation 318, which can use classical volume rendering equations or other techniques to render at least one denoised output image 512. Each denoised output image 512 represents a cleaner version of a corresponding noisy image frame 502.

In some embodiments, the operation of the trained NeRF MLP network 312 during the inferencing process 500 may be expressed as follows.

$$(C, \sigma) = MLP(r) \qquad (2)$$

Here, $MLP(\cdot)$ represents the function implemented by the trained NeRF MLP network 312, r represents a specific ray 506, and C and $\sigma$ respectively represent the color data 508 and the density data 510 determined for that specific ray 506 using the trained NeRF MLP network 312.

Although FIG. 5 illustrates one example of an inferencing process 500 using a NeRF network or other machine learning model, various changes may be made to FIG. 5. For example, various components or functions shown in FIG. 5 may be combined, further subdivided, rearranged, replicated, or omitted and additional components can be added according to particular needs.

As noted above, the blended training image frames 208 produced in the first stage by the multi-frame processing operations 206a-206n can represent RGB blended training image frames or raw blended training image frames. When the blended training image frames 208 represent RGB blended training image frames, the NeRF MLP network 312 or other machine learning model 210 may be trained as follows. Assume that a set of rays 308 denoted $$\{r_k\}_{k=1}^{K}$$

is identified based on imaging sensor poses associated with the blended training image frames 208. Also assume that l represents a set of points sampled on each ray 308. Based on this, for each point i on a ray 308 (where $i \in l$), the NeRF MLP network 312 or other machine learning model 210 can be provided inputs in the form $(x_i, y_i, z_i, \theta_i, \phi_i)$. Here, $(x_i, y_i, z_i)$ represent a specific spatial location in 3D space, and $(\theta_i, \phi_i)$ represent a specific viewing angle for the spatial location in the 3D space. The NeRF MLP network 312 or other machine learning model 210 can generate RGB color data 314 (denoted $c_i$) and density data 316 (denoted $\sigma_i$). The rendering operation 318 can generate an output image 320 based on the RGB color data 314 and the density data 316. For example, the rendering operation 318 may perform volume rendering based on the following.

$$\hat{C}_k = \sum_{i \in l} R(c_i, \sigma_i) \qquad (3)$$

Here, $\hat{C}_k$ represents a pixel color for a specified pixel that is accumulated along a specified ray 308. In Equation (3), the function $R(\cdot)$ may be defined as follows.

$$R(c_i, \sigma_i) = T_i(1 - \exp(-\sigma_i \delta_i))c_i \qquad (4)$$

$$\text{where: } T_i = \exp\left(-\sum_{j=1}^{i-1} \sigma_j \delta_j\right) \qquad (5)$$

Here, $\delta_i$ represents a distance between two adjacent samples. The same or similar operations may be performed using the trained NeRF MLP network 312 or other trained machine learning model 210 and the rendering operation 318 as part of the inferencing process 500.

During training of the NeRF MLP network 312 or other machine learning model 210 based on RGB blended training image frames 208, a loss function can be used to calculate loss values associated with the operations of the machine learning model 210. In some embodiments, the training operation 310 may use a mean squared error as a loss function to calculate the loss values associated with the operations of the machine learning model 210. As a particular example, the training operation 310 may use the following loss function to calculate the loss values associated with the operations of the machine learning model 210.

$$L_\psi(\hat{C}, C) = \sum_k (\hat{C}_k - \psi(C_k))^2 \qquad (6)$$

Here, $L_\psi(\hat{C}, C)$ represents the training loss associated with differences between the pixel colors $\hat{C}$ generated by the rendering operation 318 based on the outputs of the machine learning model 210, C represents the desired pixel colors from or based on a ground truth image, and k represents individual pixel numbers. Also, $C_k$ represents the desired pixel color for the $k^{th}$ pixel (which may be extracted from one of the noisy training image frames 204 or a cleaned version of one of the noisy training image frames 204), and $\psi$ represents a tone-mapping function. The tone-mapping function here may be used when two images being compared have different dynamic ranges.

Figure 6A:
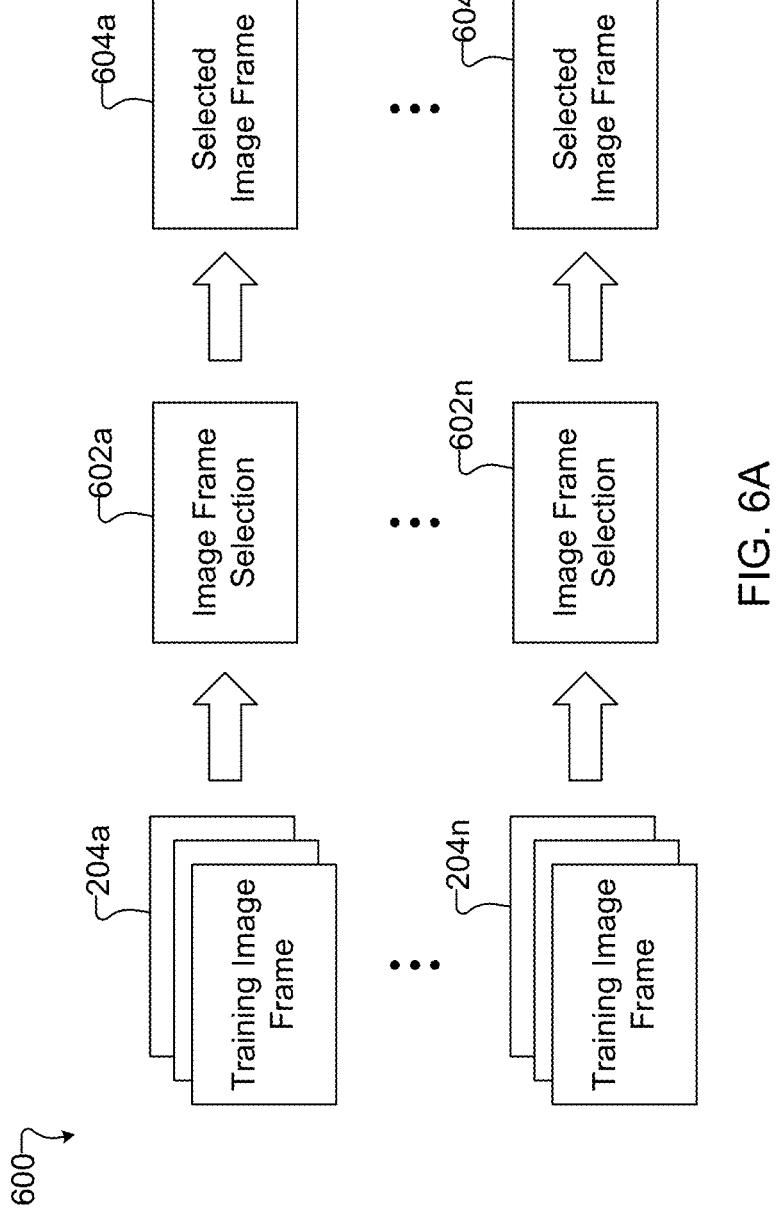
FIGS. 6A through 6C illustrate example processes supporting the use of raw blended image frames while training a NeRF network or other machine learning model according to this disclosure.
Figure 6B:
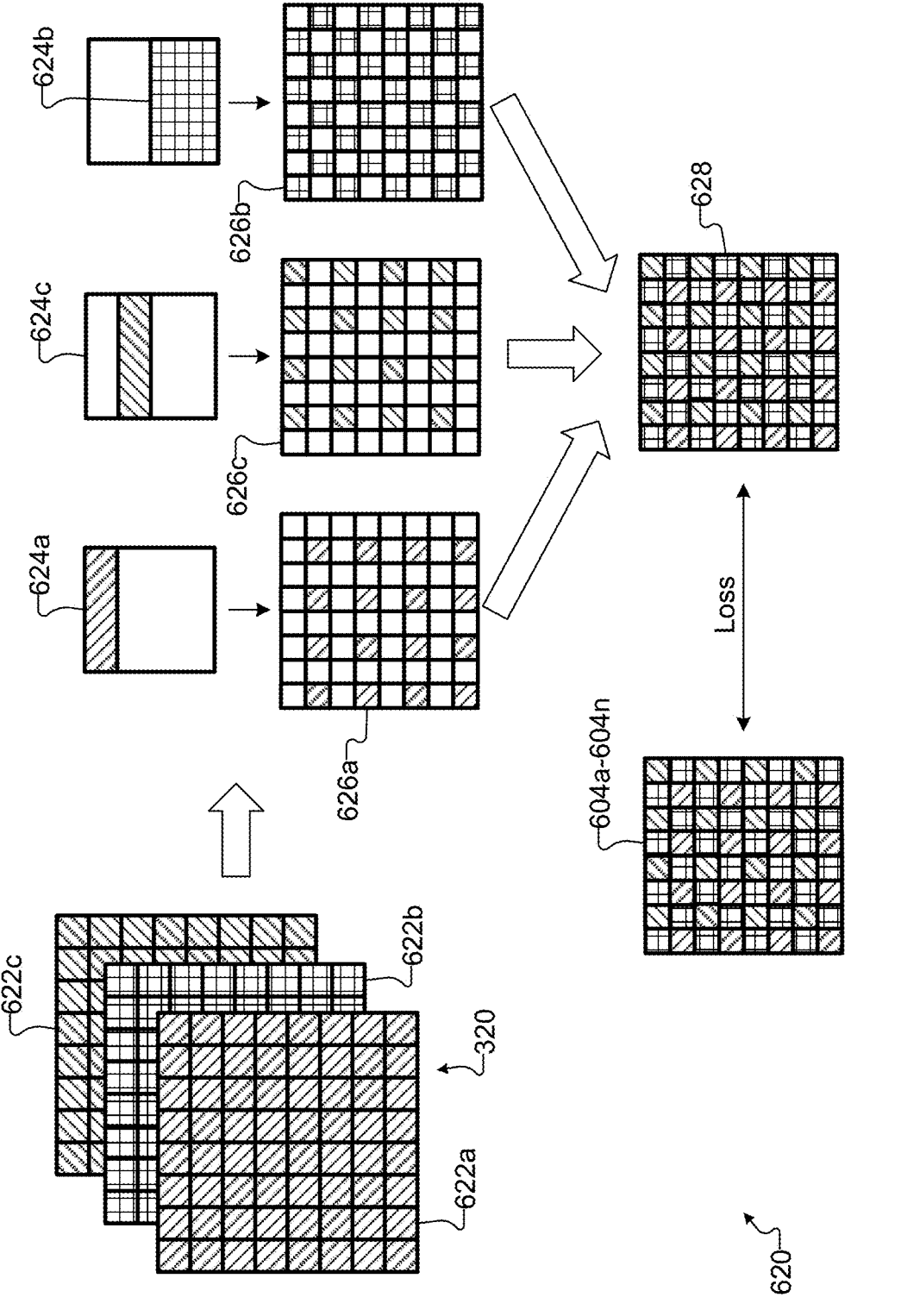
Figure 6C:
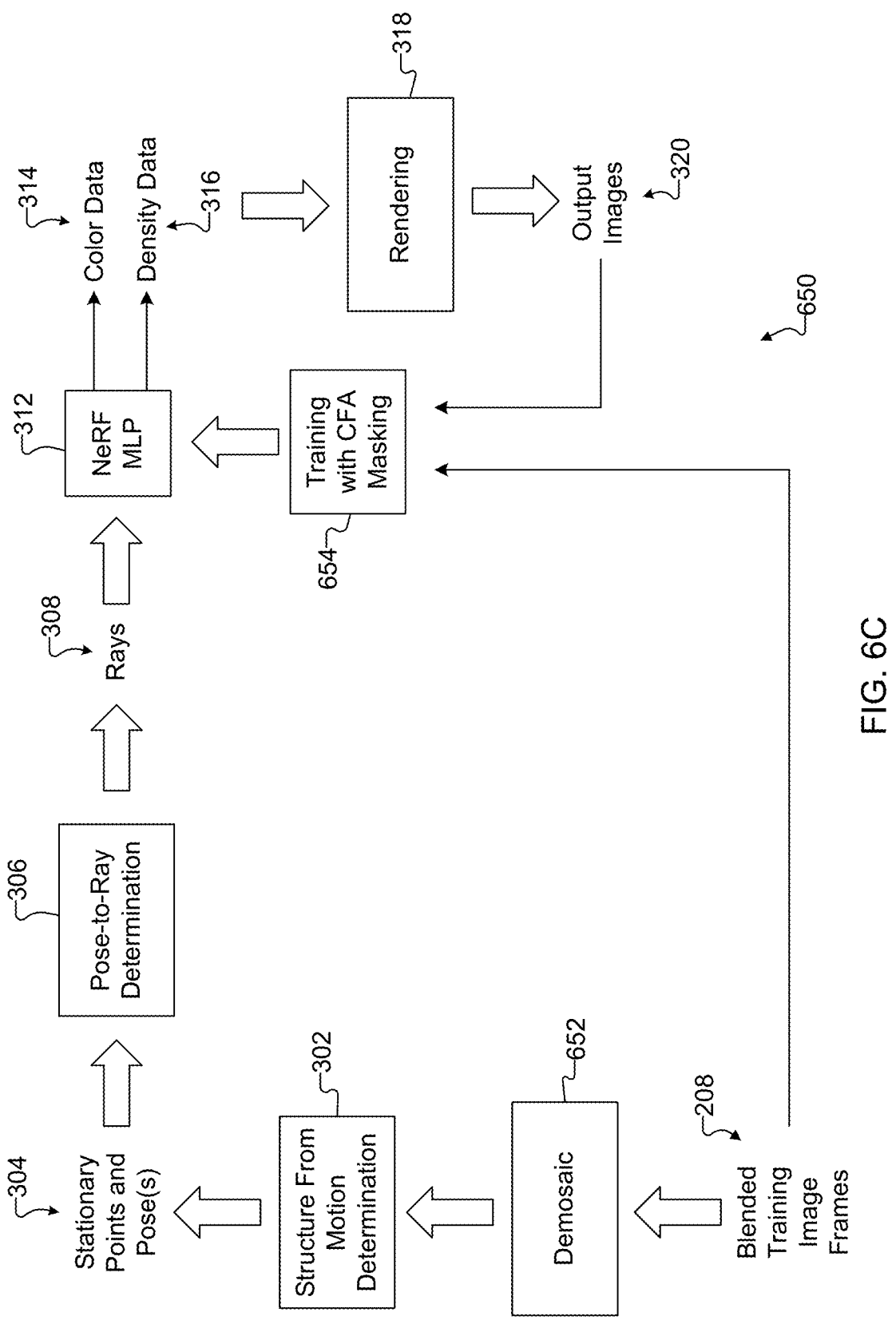

When the blended training image frames 208 represent raw blended training image frames, the NeRF MLP network 312 or other machine learning model 210 may be trained as follows in some embodiments. FIGS. 6A through 6C illustrate example processes 600, 620, 650 supporting the use of raw blended image frames 208 while training a NeRF network or other machine learning model according to this disclosure. As shown in FIG. 6A, different sets of training image frames 204a-204n can be provided to image frame selection functions 602a-602n. In some cases, each of the image frame selection functions 602a-602n may randomly or otherwise select one of the training image frames as a selected image frame 604a-604n. In other cases, each of the image frame selection functions 602a-602n may randomly or otherwise select two or more of the training image frames and blend the two or more selected training image frames to produce a selected image frame 604a-604n. The selected image frames 604a-604n represent ground truth images that will be used during training.

Because the NeRF MLP network 312 or other machine learning model 210 and the rendering operation 318 may be used to generate output images 320 in RGB format, the output images 320 can undergo a mosaicing process in order to convert the output images 320 into mosaiced image frames. The mosaiced image frames can be compared to the ground truth image frames (which represent raw image frames) in order to calculate loss values for the machine learning model 210. The process 620 of FIG. 6B represents an example mosaicing process for one of the output images 320. As shown in FIG. 6B, the NeRF MLP network 312 or other machine learning model 210 and the rendering operation 318 can be used to generate image data in multiple color channels 622a-622c. For example, the color channel 622a may represent a red color channel, the color channel 622b may represent a green color channel, and the color channel 622c may represent a blue color channel. A mosaicing of the image data in the color channels 622a-622c can be performed based on a color filter array pattern. Here, image data 624a from the red color channel 622a can be used to form a pattern 626a, image data 624b from the green color channel 622b can be used to form a pattern 626b, and image data 624c from the blue color channel 622c can be used to form a pattern 626c. In some color filter arrays, there are generally twice as many green pixels compared to red or blue pixels, which is often done to mimic the physiology of the human eye. The specific patterns 626a-626c here support the use of this type of color filter array. The patterns 626a-626c can be combined to form a mosaiced image frame 628 associated with the output image 320, which can be compared to the corresponding selected image frame 604a-604n in order to identify errors between the two. This can be repeated across any number of output images 320 and ground truth images in order to calculate a loss value for the machine learning model 210.

Training of the machine learning model 210 using color filter array masking may occur using a modified training process 650, which is shown in FIG. 6C. Here, the blended training image frames 208 are processed using a demosaic operation 652, which generally operates to restore incomplete color samples produced using an imaging sensor 180 that is overlaid with a color filter array. The resulting image frames with the restored image data are processed by the structure from motion determination operation 302, and the training process 650 may proceed in the same or similar manner as the training process 300 described above. However, the training operation 310 here is replaced with a modified training operation 654, which can support training using color filter array (CFA) masking as described above. Once the machine learning model 210 is trained, the trained machine learning model 210 can be used without the training operation 654 and in a similar manner as shown in FIG. 5. Note that the demosaic operation 652 may be performed here if the structure from motion determination operation 302 expects to receive RGB image data. If implementations of the structure from motion determination operation 302 do not require RGB image data, the demosaic operation 652 may be omitted.

During training of the NeRF MLP network 312 or other machine learning model 210 based on raw blended training image frames and the processes 600 and 620 shown here, a loss function can be used to calculate loss values associated with the operations of the machine learning model 210. In some embodiments, the training operation 654 may use a mean squared error as a loss function to calculate the loss values associated with the operations of the machine learning model 210. As a particular example, the training operation 654 may use the following loss function to calculate the loss values associated with the operations of the machine learning model 210.

$$L_{\psi,\gamma}(\hat{C}, C) = \Sigma_k(\gamma(\hat{C}_k) - \psi(C_k))^2 \qquad (7)$$

Here, $L_{\psi,\gamma}(\hat{C}, C)$ represents the training loss associated with differences between the pixel colors $\hat{C}$ generated by the rendering operation 318 based on the outputs of the machine learning model 210 (as modified by the mosaicing process), C represents the desired pixel colors from or based on a ground truth image, and k represents individual pixel numbers. Also, $C_k$ represents the desired pixel color for the $k^{th}$ pixel (which may be extracted from the ground truth image), $\psi$ represents a tone-mapping function, and $\gamma$ represents a color filter array masking. The color filter array masking here is based on the combined pattern used to produce the mosaiced image frame 628.

It is also possible to train the NeRF MLP network 312 or other machine learning model 210 using raw blended training image frames 208 but without using color filter array masking as part of the loss calculation. For example, in other embodiments, each of the raw blended training image frames 208 may be reshaped into multiple raw image channels, such as four Bayer or other raw channels. One raw channel may include red image data from a raw blended training image frame 208, one raw channel may include blue image data from the raw blended training image frame 208, and two raw channels may include green image data from the raw blended training image frame 208. Each raw channel may include half-resolution data compared to the resolution of the original raw blended training image frame 208. Here, assume that a set of rays 308 denoted $$\{r_k\}_{k=1}^{K_{Half-Res}}$$

is identified based on imaging sensor poses associated with the blended training image frames 208. Also assume that l represents a set of points sampled on each ray 308. Based on this, for each point i on a ray 308 (where $i \in l$), the NeRF MLP network 312 or other machine learning model 210 can again be provided inputs in the form $(x_i, y_i, z_i, \theta_i, \phi_i)$. The NeRF MLP network 312 or other machine learning model 210 can generate multi-channel color data and density data. The multi-channel color data can be used as part of the loss calculation described below.

Figure 7:
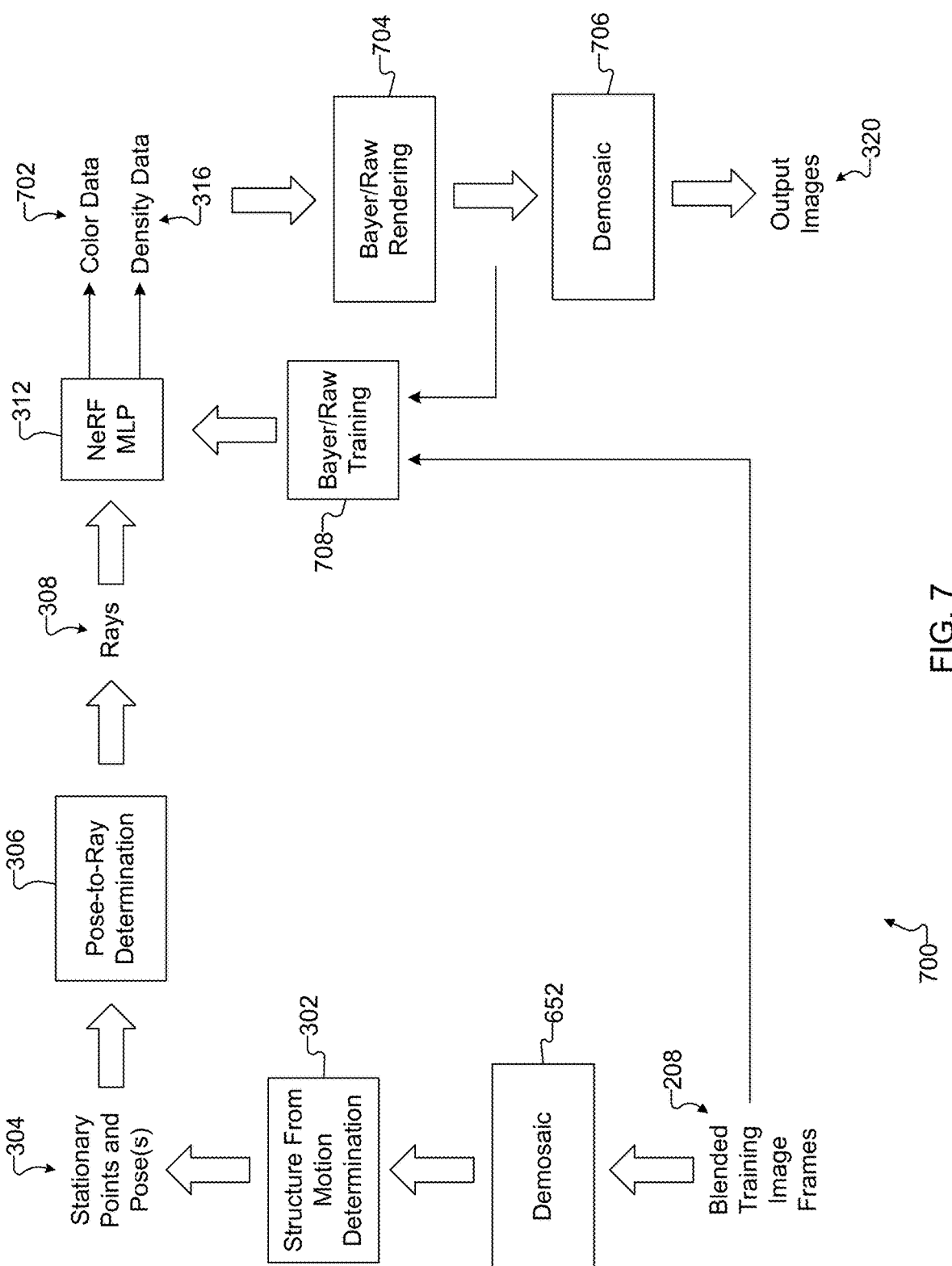
FIG. 7 illustrates another example training process for a NeRF network or other machine learning model according to this disclosure.

FIG. 7 illustrates another example training process 700 for a NeRF network or other machine learning model according to this disclosure. More specifically, training of the machine learning model 210 may occur in the manner described above using the multiple raw image channels. Here, the NeRF MLP network 312 is being trained to generate multi-channel color data 702 and density data 316, where the multi-channel color data 702 is produced using the multiple raw image channels. A Bayer or other raw rendering operation 704 can be used in place of the rendering operation 318 and can generate multi-channel image data based on the multi-channel color data 702 and the density data 316. For example, the rendering operation 704 may perform the same volume rendering as in Equations (3)-(5) but for each of the multiple color channels. The resulting image data is provided to a demosaic function 706, which can demosaic the image data in the color channels in order to generate the output images 320. The training operation 310 here is replaced with a modified training operation 708, which can support training using the multiple Bayer or other raw image channels as described above. Once the machine learning model 210 is trained, the trained machine learning model 210 can be used without the training operation 708 and in a similar manner as shown in FIG. 5.

During training of the NeRF MLP network 312 or other machine learning model 210 based on raw blended training image frames 208 divided into multiple raw image channels, a loss function can be used to calculate loss values associated with the operations of the machine learning model 210. In some embodiments, the training operation 708 may use a mean squared error as a loss function to calculate the loss values associated with the operations of the machine learning model 210. As a particular example, the training operation 708 may use the following loss function to calculate the loss values associated with the operations of the machine learning model 210.

$$L_\psi(\hat{C}, C) = \Sigma_k(\hat{C}_k - \psi(C_k))^2 \qquad (8)$$

Unlike Equation (6), however, $C_k$ here represents the desired pixel color for the $k^{th}$ pixel, which may be extracted from one of the half-resolution color channels of one of the noisy training image frames 204 (or a cleaned version of one of the noisy training image frames 204).

As can be seen here, there are various ways in which the machine learning model 210 can be trained and used, depending (among other things) on whether RGB or raw blended image frames 208 are used during the training and whether RGB or raw multi-channel data is generated by the machine learning model 210. While the description above has provided three example configurations for training and using the machine learning model 210, other configurations are also possible.

Although FIGS. 6A through 6C illustrate examples of processes 600, 620, 650 supporting the use of raw blended image frames 208 while training a NeRF network or other machine learning model, various changes may be made to FIGS. 6A through 6C. For example, various components or functions shown in FIGS. 6A through 6C may be combined, further subdivided, rearranged, replicated, or omitted and additional components can be added according to particular needs. As a particular example, n image frame selection functions 602a-602n are shown here (one for each selected image frame 604a-604n) However, it is also possible to use fewer image frame selection functions or one image frame selection functions to process sets of training image frames 204a-204n sequentially. Although FIG. 7 illustrates another example of a training process 700 for a NeRF network or other machine learning model, various changes may be made to FIG. 7. For instance, various components or functions shown in FIG. 7 may be combined, further subdivided, rearranged, replicated, or omitted and additional components can be added according to particular needs.

It should be noted that the functions shown in FIGS. 2 through 7 or described above can be implemented in an electronic device 101, 102, 104, server 106, or other device(s) in any suitable manner. For example, in some embodiments, at least some of the functions shown in FIGS. 2 through 7 or described above can be implemented or supported using one or more software applications or other software instructions that are executed by the processor 120 of the electronic device 101, 102, 104, server 106, or other device(s). In other embodiments, at least some of the functions shown in FIGS. 2 through 7 or described above can be implemented or supported using dedicated hardware components. In general, the functions shown in FIGS. 2 through 7 or described above can be performed using any suitable hardware or any suitable combination of hardware and software/firmware instructions. Also, the functions shown in FIGS. 2 through 7 or described above can be performed by a single device or by multiple devices.

FIGS. 8A through 8C illustrate example results obtained using a trained NeRF network or other machine learning model according to this disclosure. In this example, FIG. 8A contains an image frame 800, which may represent one example of a noisy image frame 502 being processed. As can be seen here, the image frame 800 contains much noise. FIG. 8B contains an image frame 802 generated using a standard artificial intelligence noise reduction (AiNr) algorithm. As can be seen by comparing FIGS. 8A and 8B, the image frame 802 does remove some noise contained in the image frame 800, but the image frame 802 still contains some noise and lacks various details. For instance, the image frame 802 tends to be somewhat blurry in areas, which reduces its appearance. In contrast, FIG. 8C illustrates an image frame 804 generated using a NeRF MLP network 312 or other machine learning model 210 trained and used as described above. As can be seen by comparing FIGS. 8A through 8C, the image frame 804 is of higher quality than the image frame 802. Among other things, the image frame 804 is cleaner, removes more noise, and is sharper than the image frame 802.

Although FIGS. 8A through 8C illustrate one example of results obtained using a trained NeRF network or other machine learning model, various changes may be made to FIGS. 8A through 8C. For example, the contents of the image frames that are processed and generated can vary widely depending on the circumstances, such as the scene being imaged and the device or devices used to capture the images. Also, the results obtained using a standard AiNr algorithm and the approaches described above can vary widely depending on the circumstances, such as depending on how well the NeRF network or other machine learning model 210 is trained and the quality of its training data. The results shown in FIGS. 8A through 8C are merely meant to illustrate one example of the type of results that may be obtained using the machine learning model training and inferencing techniques described in this patent document.

Figure 9:
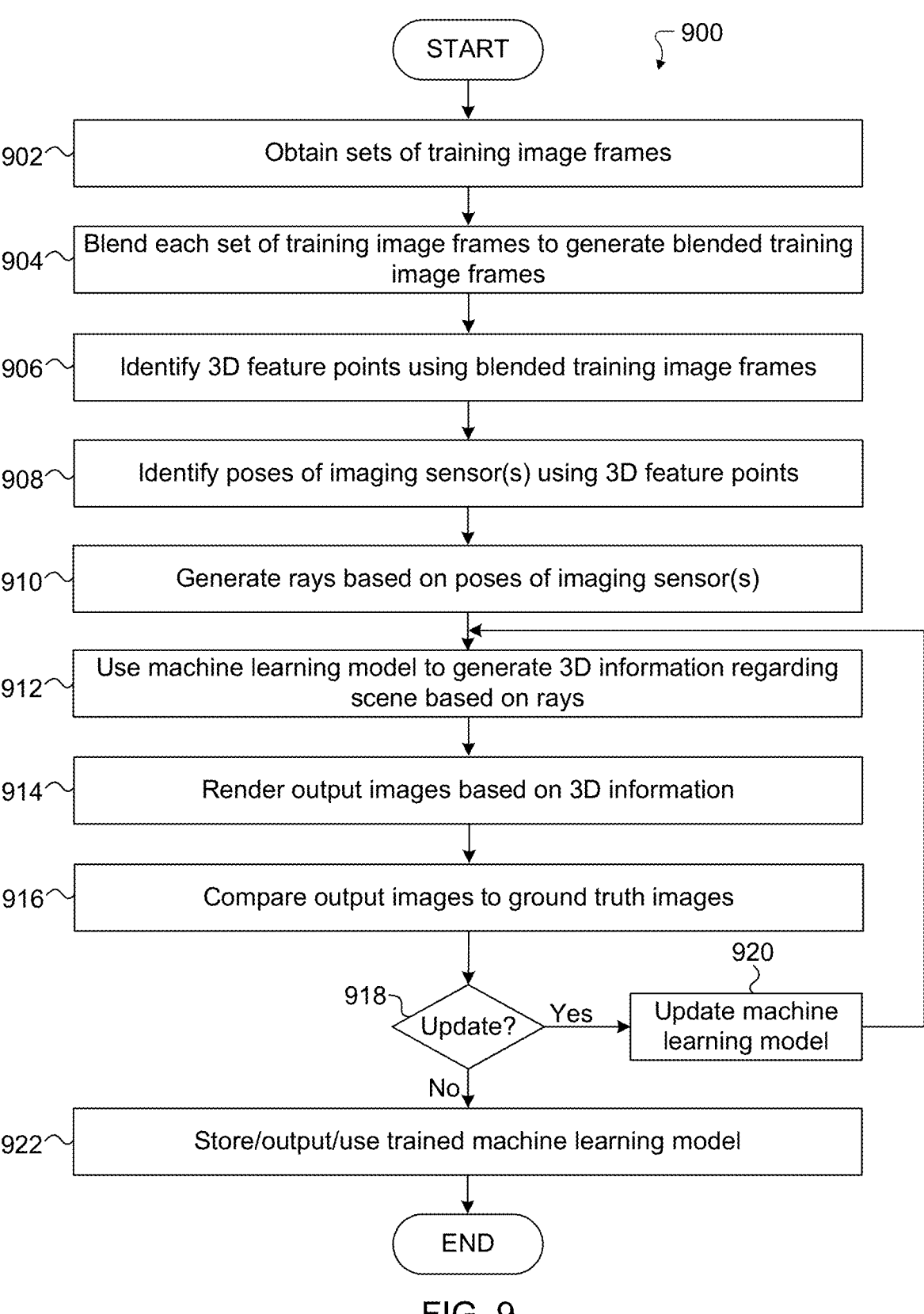
FIG. 9 illustrates an example method for training a NeRF network or other machine learning model based on multi-stage multi-frame denoising according to this disclosure.

FIG. 9 illustrates an example method 900 for training a NeRF network or other machine learning model based on multi-stage multi-frame denoising according to this disclosure. For ease of explanation, the method 900 is described as being performed by the server 106 in the network configuration 100 of FIG. 1. However, the method 900 may be performed using any other suitable device(s) (such as the electronic device 101) and in any other suitable system(s).

As shown in FIG. 9, multiple sets of training image frames of a scene are obtained at step 902. This may include, for example, the processor 120 of the server 106 obtaining multiple sets of training image frames 204, 204a-204n from one or more imaging sensors 202a-202n or other source(s) of image frames of the scene. Each set of training image frames 204 can capture the scene at a common viewpoint and viewing angle relative to the scene, thereby providing similarity between those image frames of the scene. Also, different sets of training image frames 204 can capture the scene at different viewpoints and viewing angles relative to the scene, thereby providing different perspectives of the scene. Each set of training image frames is blended to generate multiple blended training image frames at step 904. This may include, for example, the processor 120 of the server 106 using the multi-frame processing operation(s) 206a-206n in order to blend each set of training image frames 204, 204a-204n and generate blended training image frames 208. In some cases, each multi-frame processing operation 206a-206n may (for each set) perform alignment of at least some of the training image frames 204, 204a-204n in the set, perform deghosting of one or more of the training image frames 204, 204a-204n in the set, and blend the training image frames 204, 204a-204n in the set after the alignment and the deghosting.

A machine learning model is trained using the blended image frames. For example, 3D feature points associated with the scene are identified using the blended training image frames at step 906, and poses of one or more imaging sensors are identified at step 908. This may include, for example, the processor 120 of the server 106 using the structure from motion determination operation 302 in order to generate outputs 304, such as sparse 3D feature points that represent stationary points within the scene and imaging sensor poses that identify the poses of the imaging sensor(s) 202a-202n used to capture the training image frames 204. Rays are generated based on the poses of the imaging sensor(s) at step 910. This may include, for example, the processor 120 of the server 106 using the pose-to-ray determination operation 306 in order to convert the imaging sensor poses into corresponding rays 308 within the scene. The machine learning model is used to generate 3D information regarding the scene based on the rays at step 912. This may include, for example, the processor 120 of the server 106 using the NeRF MLP network 312 or other machine learning model 210 being trained to generate color data and density data. Output images are rendered based on the 3D information at step 914. This may include, for example, the processor 120 of the server 106 using the rendering operation 318, 704 in order to generate output images 320.

The output images are compared to ground truth images at step 916. This may include, for example, the processor 120 of the server 106 using the training operation 310 in order to identify a loss value based on errors between the output images 320 and corresponding ground truth images (or toned-mapped versions of the corresponding ground truth images). If necessary (such as when the loss value exceeds a threshold value), a determination is made to update the machine learning model at step 918, and the machine learning model is updated at step 920. This may include, for example, the processor 120 of the server 106 using the training operation 310 in order to update weights or other hyperparameters of the machine learning model 210 when the loss value exceeds the threshold value. The process then returns to an earlier step to perform another training iteration. Note that while FIG. 9 shows the process returning to step 912 and assumes that the same training images are used in the next iteration, the process may return to an earlier step in order to obtain and use other or additional training data (such as other training image frames 204).

This process allows the machine learning model 210 to be trained to generate 3D information about the scene from various viewpoints and viewing angles, including those not captured in the sets of training image frames 204, 204a-204n. Eventually, the loss value falls below the threshold value, and the machine learning model 210 is considered to be adequately trained. At that point, the trained machine learning model may be used in any suitable manner. For example, the trained machine learning model may be stored, output, or used at step 922. This may include, for example, the processor 120 of the server 106 storing the trained machine learning model 210 and using the trained machine learning model 210 during inferencing. This may also or alternatively include the server 106 deploying the trained machine learning model 210 to one or more other devices (such as the electronic device 101) for inferencing.

Although FIG. 9 illustrates one example of a method 900 for training a NeRF network or other machine learning model based on multi-stage multi-frame denoising, various changes may be made to FIG. 9. For example, while shown as a series of steps, various steps in FIG. 9 may overlap, occur in parallel, occur in a different order, or occur any number of times.

Figure 10:
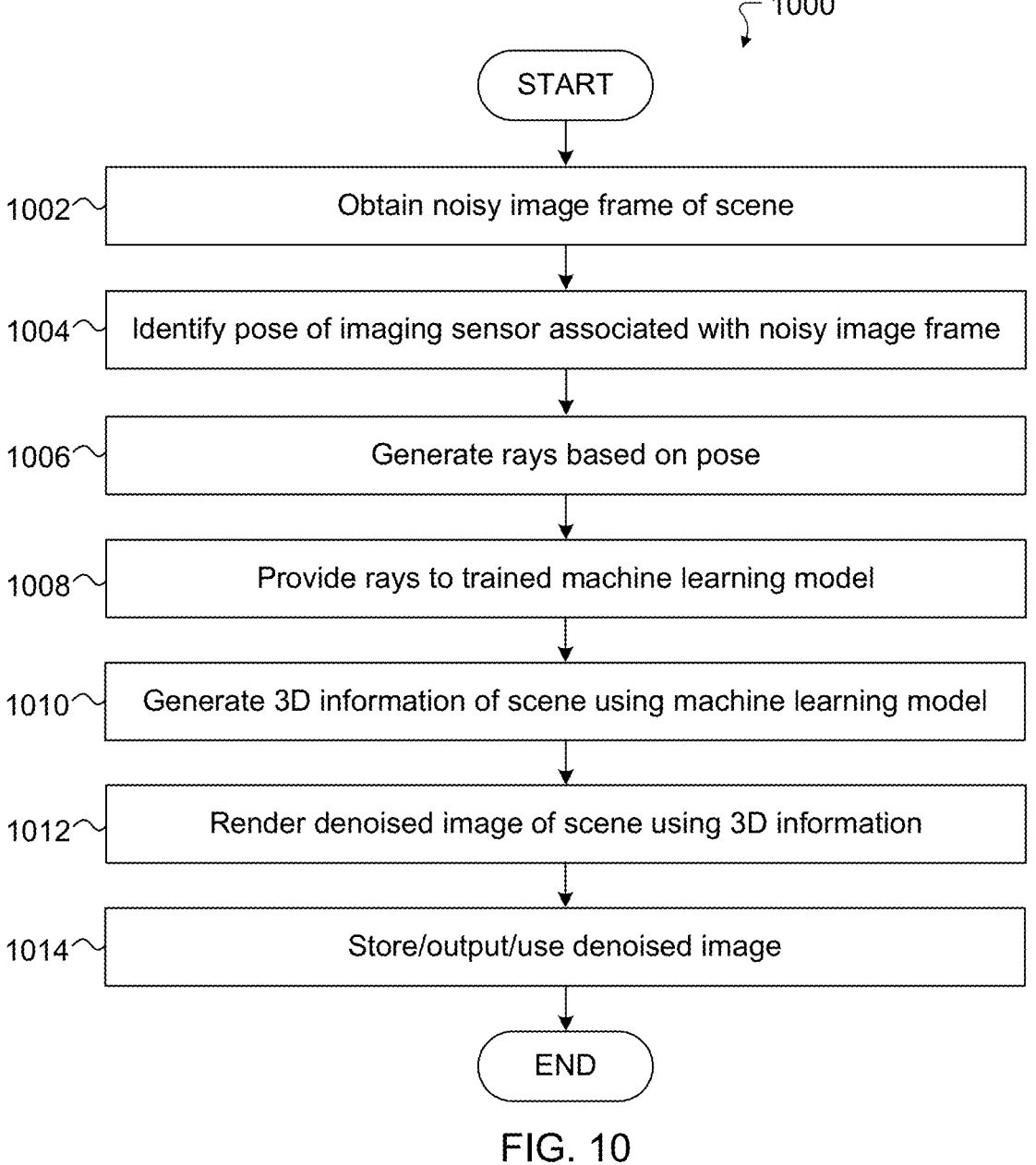
FIG. 10 illustrates an example method for image denoising using a NeRF network or other machine learning model according to this disclosure.

FIG. 10 illustrates an example method 1000 for image denoising using a NeRF network or other machine learning model according to this disclosure. For ease of explanation, the method 1000 is described as being performed by the electronic device 101 in the network configuration 100 of FIG. 1. However, the method 1000 may be performed using any other suitable device(s) (such as the server 106) and in any other suitable system(s).

As shown in FIG. 10, at least one noisy image frame of a scene is obtained at step 1002. This may include, for example, the processor 120 of the electronic device 101 obtaining at least one noisy image frame 502 from one or more imaging sensors 180 of the electronic device 101. At least one pose of the imaging sensor(s) is identified at step 1004, and rays are generated based on the pose(s) of the imaging sensor(s) at step 1006. This may include, for example, the processor 120 of the electronic device 101 using the structure from motion determination operation 302 in order to generate outputs 304, such as one or more imaging sensor poses that identify at least one pose of at least one imaging sensor 180 used to capture the at least one noisy image frame 502. This may also include the processor 120 of the electronic device 101 using the pose-to-ray determination operation 306 in order to convert the imaging sensor pose(s) into corresponding rays 308 within the scene.

The rays are provided to a trained machine learning model at step 1008, and 3D information about the scene is generated using the trained machine learning model at step 1010. This may include, for example, the processor 120 of the electronic device 101 generating color data and density data using the trained NeRF MLP network 312 or other trained machine learning model 210. A denoised image of the scene is rendered using the 3D information at step 1012. This may include, for example, the processor 120 of the electronic device 101 using the rendering operation 318, 704 (and optionally the demosaic function 706) in order to generate at least one denoised image 512 of the scene.

Each denoised image may be used in any suitable manner. For example, each denoised image may be stored, output, or used at step 1014. This may include, for example, the processor 120 of the electronic device 101 presenting a denoised image 512 on the display 160 of the electronic device 101, saving the denoised image 512 to a camera roll stored in a memory 130 of the electronic device 101, or attaching the denoised image 512 to a text message, email, or other communication to be transmitted from the electronic device 101. Note, however, that the denoised image 512 could be used in any other or additional manner.

Although FIG. 10 illustrates one example of a method 1000 for image denoising using a NeRF network or other machine learning model, various changes may be made to FIG. 10. For example, while shown as a series of steps, various steps in FIG. 10 may overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

obtaining, using at least one processing device of an electronic device, raw image frames of a scene, wherein the raw image frames include different sets of raw image frames captured at different viewpoints and different viewing angles relative to the scene;

performing, using the at least one processing device, blending of the raw image frames within each set of raw image frames in order to generate multiple blended image frames of the scene; and training, using the at least one processing device, a machine learning model using the blended image frames, the machine learning model trained to generate three-dimensional (3D) information about the scene from viewpoints and viewing angles not captured in the sets of raw image frames.

2. The method of claim 1, wherein performing the blending of the raw image frames within each set of raw image frames comprises, for each set of raw image frames:

performing alignment of at least some of the raw image frames in the set of raw image frames;

performing deghosting of one or more of the raw image frames in the set of raw image frames; and blending the raw image frames in the set of raw image frames after the alignment and the deghosting.

3. The method of claim 1, wherein training the machine learning model comprises:

generating structure from motion using the blended image frames in order to identify 3D feature points within the scene;

identifying poses of one or more imaging sensors that capture the raw image frames based on the 3D feature points within the scene; and generating rays based on the poses of the one or more imaging sensors.

4. The method of claim 3, wherein training the machine learning model further comprises:

using the machine learning model to generate color and density information for points along each ray; and training the machine learning model to generate the color and density information while minimizing a loss between (i) a rendered image based on the color and density information and (ii) a tone-mapped version of a noisy image.

5. The method of claim 1, wherein:

the blended image frames comprise raw blended image frames; and the machine learning model is trained using the raw blended image frames by, for each set of raw image frames:

identifying a ground truth image, the ground truth image comprising one of: a selected raw image frame from the set of raw image frames or a blended version of multiple selected raw image frames from the set of raw image frames;

generating image data in multiple color channels using the machine learning model;

applying color filter array masking to the image data in the color channels in order to generate masked image data; and comparing the masked image data and a tone-mapped version of image data from the ground truth image in order to identify a loss associated with the machine learning model.

6. The method of claim 1, wherein:

the blended image frames comprise raw blended image frames; and the machine learning model is trained using the raw blended image frames by, for each set of raw image frames:

selecting one of the raw image frames from the set of raw image frames as a ground truth image;

generating image data in multiple color channels using the machine learning model, the image data having a color filter array form; and comparing the image data in the color channels and a tone-mapped version of image data from the ground truth image in order to identify a loss associated with the machine learning model.

7. The method of claim 1, wherein:

the blended image frames comprise RGB image frames; and the machine learning model is trained using the RGB image frames.

8. The method of claim 1, wherein the machine learning model comprises a neural radiance field network configured to generate color and density information associated with the scene.

9. An electronic device comprising:

at least one processing device configured to:

obtain raw image frames of a scene, wherein the raw image frames include different sets of raw image frames captured at different viewpoints and different viewing angles relative to the scene;

perform blending of the raw image frames within each set of raw image frames in order to generate multiple blended image frames of the scene; and train a machine learning model using the blended image frames, the machine learning model trained to generate three-dimensional (3D) information about the scene from viewpoints and viewing angles not captured in the sets of raw image frames.

10. The electronic device of claim 9, wherein, to perform the blending of the raw image frames within each set of raw image frames, the at least one processing device is configured, for each set of raw image frames, to:

perform alignment of at least some of the raw image frames in the set of raw image frames;

perform deghosting of one or more of the raw image frames in the set of raw image frames; and blend the raw image frames in the set of raw image frames after the alignment and the deghosting.

11. The electronic device of claim 9, wherein, to train the machine learning model, the at least one processing device is configured to:

generate structure from motion using the blended image frames in order to identify 3D feature points within the scene;

identify poses of one or more imaging sensors that capture the raw image frames based on the 3D feature points within the scene; and generate rays based on the poses of the one or more imaging sensors.

12. The electronic device of claim 11, wherein, to train the machine learning model, the at least one processing device is further configured to:

use the machine learning model to generate color and density information for points along each ray; and train the machine learning model to generate the color and density information while minimizing a loss between (i) a rendered image based on the color and density information and (ii) a tone-mapped version of a noisy image.

13. The electronic device of claim 9, wherein:

the blended image frames comprise raw blended image frames;

the at least one processing device is configured to train the machine learning model using the raw blended image frames; and to train the machine learning model, the at least one processing device is configured, for each set of raw image frames, to:

identify a ground truth image, the ground truth image comprising one of: a selected raw image frame from the set of raw image frames or a blended version of multiple selected raw image frames from the set of raw image frames;

generate image data in multiple color channels using the machine learning model;

apply color filter array masking to the image data in the color channels in order to generate masked image data; and compare the masked image data and a tone-mapped version of image data from the ground truth image in order to identify a loss associated with the machine learning model.

14. The electronic device of claim 9, wherein:

the blended image frames comprise raw blended image frames;

the at least one processing device is configured to train the machine learning model using the raw blended image frames; and to train the machine learning model, the at least one processing device is configured, for each set of raw image frames, to:

select one of the raw image frames from the set of raw image frames as a ground truth image;

generate image data in multiple color channels using the machine learning model, the image data having a color filter array form; and compare the image data in the color channels and a tone-mapped version of image data from the ground truth image in order to identify a loss associated with the machine learning model.

15. The electronic device of claim 9, wherein:

the blended image frames comprise RGB image frames; and the at least one processing device is configured to train the machine learning model using the RGB image frames.

16. The electronic device of claim 9, wherein the machine learning model comprises a neural radiance field network configured to generate color and density information associated with the scene.

17. A non-transitory machine readable medium containing instructions that when executed cause at least one processor of an electronic device to:

obtain raw image frames of a scene, wherein the raw image frames include different sets of raw image frames captured at different viewpoints and different viewing angles relative to the scene;

perform blending of the raw image frames within each set of raw image frames in order to generate multiple blended image frames of the scene; and train a machine learning model using the blended image frames, the machine learning model trained to generate three-dimensional (3D) information about the scene from viewpoints and viewing angles not captured in the sets of raw image frames.

18. The non-transitory machine readable medium of claim 17, wherein the instructions that when executed cause the at least one processor to perform the blending of the raw image frames within each set of raw image frames comprise instructions that when executed cause the at least one processor, for each set of raw image frames, to:

perform alignment of at least some of the raw image frames in the set of raw image frames;

perform deghosting of one or more of the raw image frames in the set of raw image frames; and blend the raw image frames in the set of raw image frames after the alignment and the deghosting.

19. The non-transitory machine readable medium of claim 17, wherein the instructions that when executed cause the at least one processor to train the machine learning model comprise instructions that when executed cause the at least one processor to:

generate structure from motion using the blended image frames in order to identify 3D feature points within the scene;

identify poses of one or more imaging sensors that capture the raw image frames based on the 3D feature points within the scene; and generate rays based on the poses of the one or more imaging sensors.

20. The non-transitory machine readable medium of claim 17, wherein the instructions that when executed cause the at least one processor to train the machine learning model comprise instructions that when executed cause the at least one processor to:

use the machine learning model to generate color and density information for points along each ray; and train the machine learning model to generate the color and density information while minimizing a loss between (i) a rendered image based on the color and density information and (ii) a tone-mapped version of a noisy image.

* * * * *